April 8, 1952 P. B. BENNER 2,591,770
CABLE LAYING SHEAVE
Filed March 24, 1949 4 Sheets-Sheet 1

INVENTOR.
Paul B. Benner
BY Charles M. Fryer
ATTORNEY.

April 8, 1952 P. B. BENNER 2,591,770
CABLE LAYING SHEAVE
Filed March 24, 1949 4 Sheets-Sheet 2
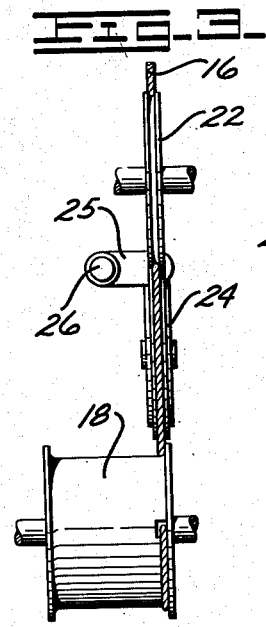
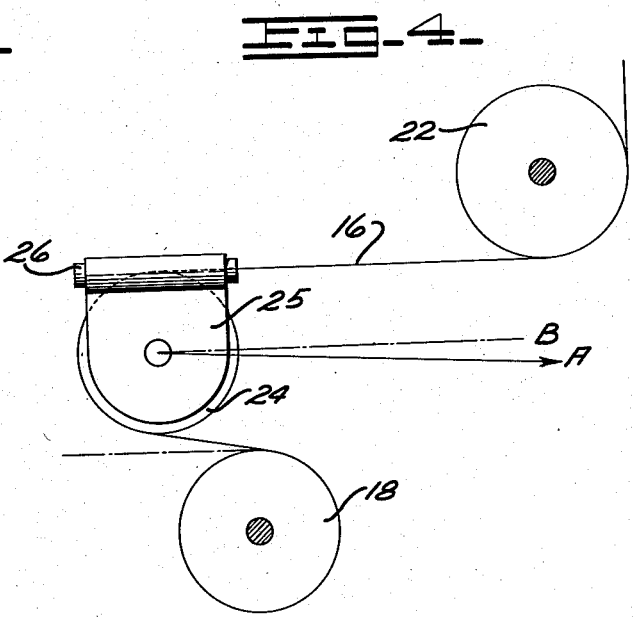
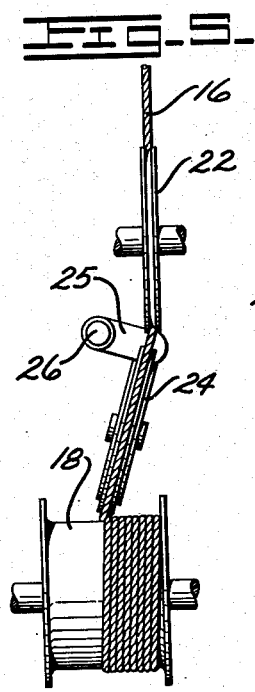
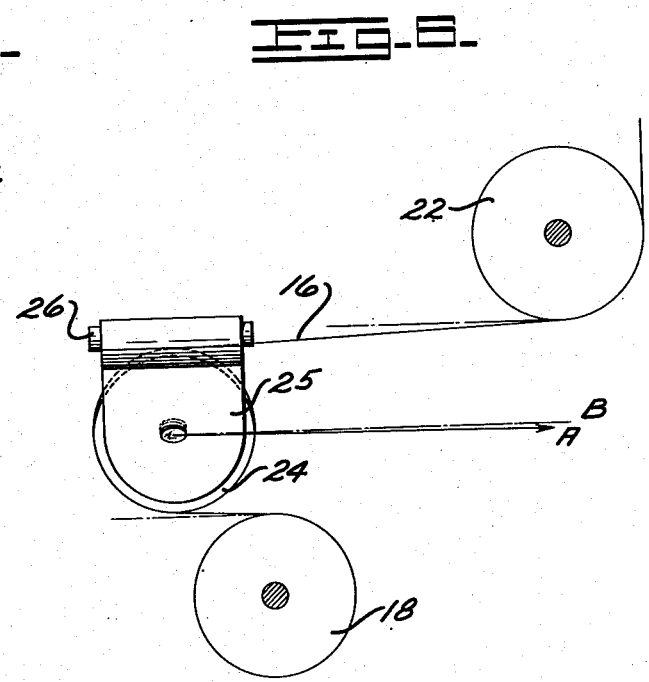
INVENTOR.
Paul B. Benner
BY Charles M. Fryer
ATTORNEY.

April 8, 1952 P. B. BENNER 2,591,770
CABLE LAYING SHEAVE
Filed March 24, 1949 4 Sheets-Sheet 3

INVENTOR.
Paul B. Benner
BY Charles M. Fryer
ATTORNEY.

April 8, 1952  P. B. BENNER  2,591,770
CABLE LAYING SHEAVE
Filed March 24, 1949  4 Sheets-Sheet 4

INVENTOR.
Paul B. Benner
BY Charles M. Fryer
ATTORNEY.

Patented Apr. 8, 1952

2,591,770

UNITED STATES PATENT OFFICE 2,591,770

CABLE LAYING SHEAVE

Paul B. Benner, Peoria, Ill., assignor to Caterpillar Tractor Co., Peoria, Ill., a corporation of California Application March 24, 1949, Serial No. 83,159

1 Claim. (Cl. 254—190)

This invention relates to cable laying sheaves in general and particularly to the arrangement of sheaves employed for laying or directing cables as they are wound upon cable winding drums.

The invention is particularly adapted for use in connection with control cables extending between a draft implement and a drawn implement, such as an earth-moving scraper or the like, and for purposes of illustration will be disclosed herein in connection with such use. It will be apparent from the disclosure however, that the invention is not limited to the combination of equipment shown but is capable of general application in many fields.

It is conventional practice where cable is wound upon a drum or the like to employ a sheave for guiding the payed out cable toward the drum as it is being wound. The guide sheave is usually pivotally supported in a manner to permit it to swing, following the direction of the cable as it progresses from side to side of the drum, facilitating the orderly arrangement or laying of the individual turns of the cable thereon. Laying of the cable on the drum in this manner causes it to rub against its adjacent wrap resulting in considerable wear. Also in many installations in which space limitations do not permit a favorable ratio between the width of the drum and the distance to the guide sheave, the angle of inclination between the cable and the axis of the winding drum becomes so small that the cable will not wrap across the full width of the drum. As a result, the wrapping becomes uneven and tends to concentrate in the central portion of the drum.

It is, therefore, an object of this invention to provide a construction and arrangement for cable laying sheaves whereby tension in the cable causes the cable laying sheave to rock in anticipation of the progressing spiral of the cable on the drum thus reducing the rubbing action of the cable on itself, as well as insuring that the wraps are evenly spaced across the full width of the drum. Other objects and advantages of this invention are made apparent in the following specification wherein reference is made to the accompanying drawings.

In the drawings:

Fig. 3 is a schematic end view of the guide sheaves and cable winding drum illustrating the position of the various elements during the first wrap of the cable;

Fig. 4 is a schematic view in side elevation of the parts illustrated in Fig. 3;

Fig. 5 is a schematic end view of the guide sheaves and cable winding drum in their positions at the midpoint of the first layer of cable wraps on the drum;

Fig. 6 is a schematic view in side elevation of the parts illustrated in Fig. 5;

Figure 1:
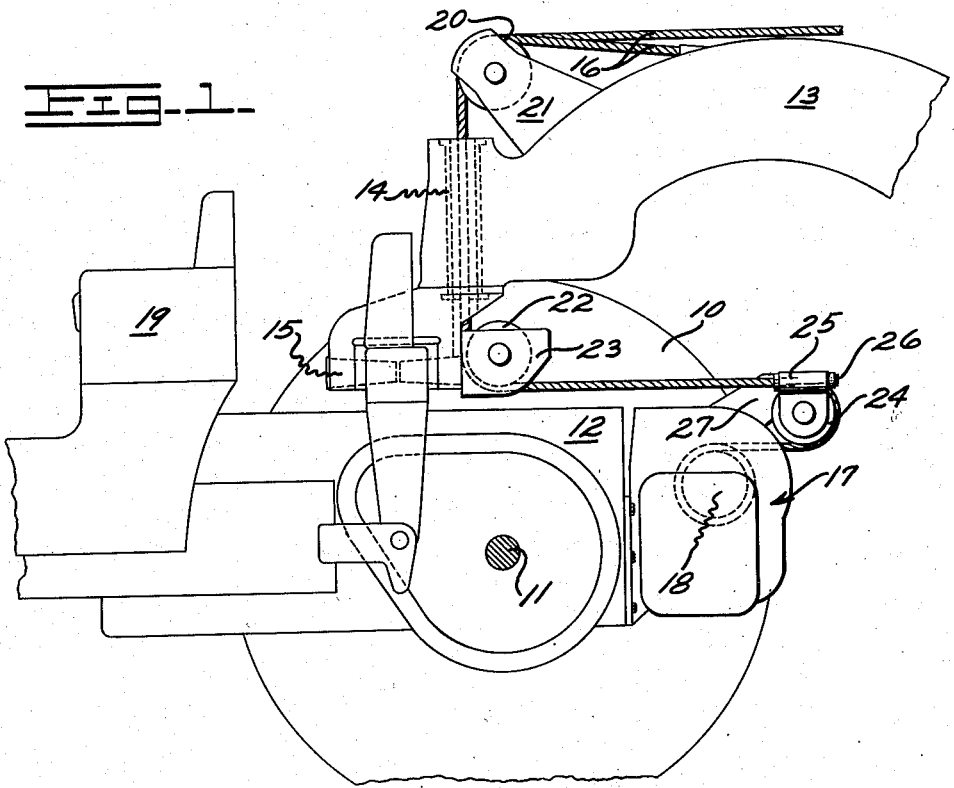
Fig. 1 is a partial view in side elevation of the rear portion of a tractor and the draft connection of an earth-moving scraper or the like illustrating the application of the present invention to control cables extending between the tractor and the scraper.
Figure 2:
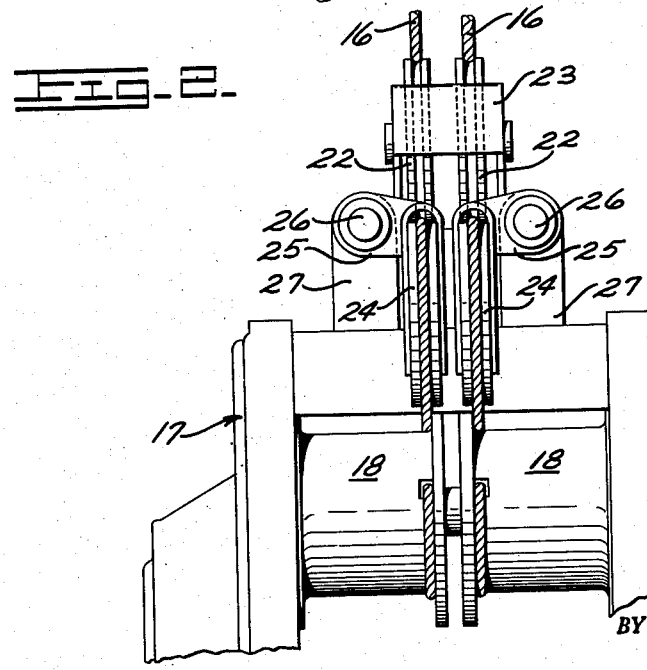
Fig. 2 is an enlarged fragmentary end view of a portion of the cable control equipment shown in Fig. 1 illustrating the manner in which the cable winding drums and cables are arranged.

In Fig. 1 of the drawings, the rear portion of a tractor is shown as supported on ground engaging wheels 10, only one of which is illustrated but which are supported on axles 11 projecting from a transmission case 12. The tractor serves as a draft vehicle for an earth-moving scraper or the like, the draft frame of which is illustrated at 13 as universally connected to the rear of the tractor by means of a hitch comprising a hollow vertical pivotal member 14 and a horizontal pivotal member 15. Movable elements of the scraper are controlled by a pair of cables 16 extending from the scraper to a conventional cable control unit 17 secured to the tractor transmission case 12. The cable control unit comprises a pair of cable winding drums 18 powered for rotation through a suitable drive connection (not shown) from the transmission. Operation of each of the cable winding drums 18 may be selectively controlled from the tractor operator's station 19 through any suitable mechanism (not shown).

The cables 16 are guided through the pivotal connection 14 by a pair of sheaves 20 supported for rotation in a bracket 21 extending from the draft connection 13 and a second pair of sheaves 22 supported for rotation in a bracket 23 secured to the lower part of the tractor hitch. From the guide sheaves 22, the cables pass around a pair of cable laying sheaves 24 to the cable winding drums 18. Each of the sheaves 24 is supported for rotation in one end of an angular bracket 25, which at its opposite end is pivotally supported from a trunnion 26 carried in an arm 27 extending from the transmission case. The brackets 25 are free to swing about their respective off center pivots 26 permitting the guide sheaves to follow the direction of the cable as it is wound on the drum.

In a conventional cable control unit, swinging of the bracket 25 about its pivotal support 26 is accomplished by the side pull of the cable between the cable laying sheave and the surface of the drum. This side pull is accompanied by the rubbing contact between the cable and its adjacent wrap upon the drum causing excessive wear on the cable. The present invention provides an arrangement of a guide sheave, a cable laying sheave, and a cable winding drum whereby tension in the cable urges the cable laying sheave to rock in anticipation of the progressing spiral of the cable on the drum thus reducing the rubbing pressure of the cable against its adjacent wrap. This is accomplished by locating the guide sheave 22 and the cable laying sheave 24 relative to the cable winding drum 18 so that the resultant force of cable tension acting on the cable laying sheave is inclined with respect to the longitudinal axis of the pivotal support 26 of the bracket 25. The resultant force of the cable tension acting on the sheave 24 may be resolved into two components, one acting parallel to the pivotal axis of the bracket 25, and the other acting normal thereto. As each of the cable laying sheaves is carried in a bracket 25 having an off center pivotal support 26, the component of the resultant force acting on the sheave normal to the pivotal axis of the bracket, urges the bracket to swing about its pivotal support.

The principle of operation and the manner in which this principle is utilized to obtain even spooling of a cable on its cable winding drum with a minimum of cable friction is illustrated schematically in Figs. 3 through 14 in various operating positions. In Figs. 3 and 4, the cable 16 and the cable laying sheave 24 are shown in the positions they would assume at the beginning of the first layer of cable wraps on the drum 18. In Fig. 4, line A represents the direction of the resultant force of cable tension acting on the cable laying sheave 24 and the broken line B is parallel to the pivotal axis 26 of bracket 25. In this position, the direction of the resultant force is inclined downwardly with respect to the pivotal axis of the bracket 25. Due to the offset of the cable laying sheave 24 with respect to the pivotal support of the bracket 25, the resultant force urges the bracket to swing in a clockwise direction, as viewed in Fig. 3, or in the direction of the progressing spiral of cable wraps on the drum.

Figs. 5 and 6 illustrate the position of the sheave 24 relative to the cable winding drum at approximately the midpoint of the first layer of cable wraps. In this position, the resultant force A is still inclined downwardly with respect to line B, urging the bracket 25 to swing in a clockwise direction.

Figure 7:
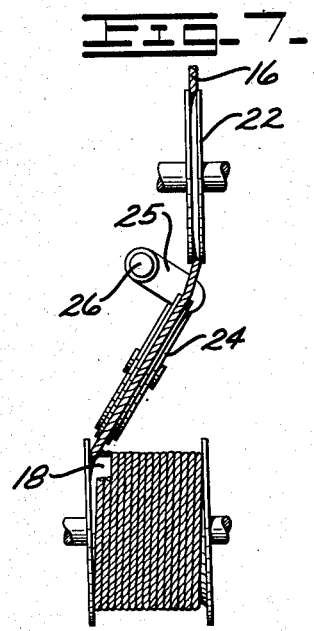
Fig. 7 is a schematic end view of the guide sheaves and the cable winding drum illustrating the position of the various parts at the end of the first layer of cable wraps on the drum.
Figure 8:
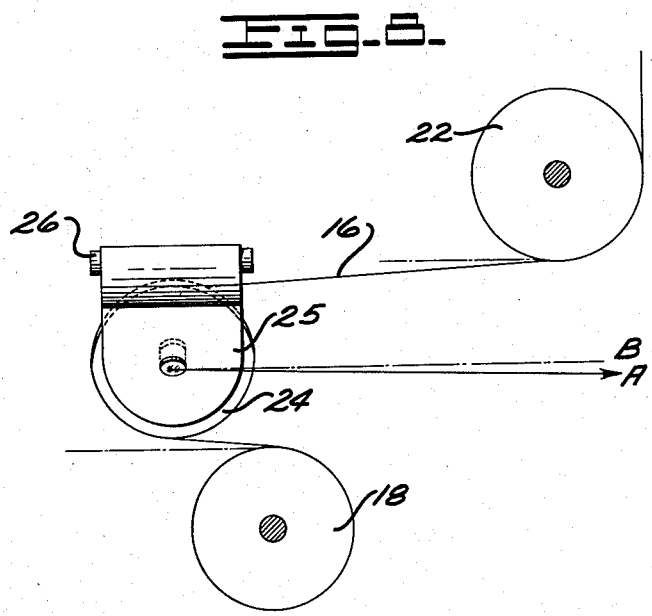
Fig. 8 is a schematic view in side elevation of the parts illustrated in Fig. 7.

Figs. 7 and 8 illustrate the position of the sheave 24 relative to the cable winding drum at the end of the first layer of cable wraps. In this position, the resultant force A is also inclined downwardly with respect to line B, urging the bracket 25 to swing in a clockwise direction.

Figure 9:
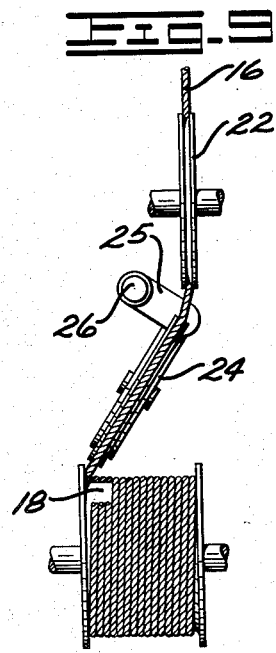
Fig. 9 is a schematic end view of the guide sheaves and cable winding drum illustrating the position of the various parts at the beginning of the second layer of cable wraps on the drum.
Figure 10:
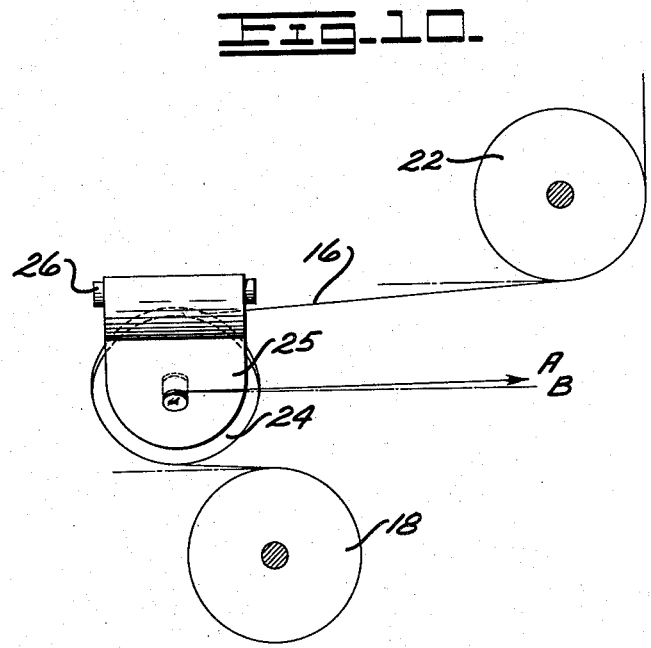
Fig. 10 is a schematic view in side elevation of the parts illustrated in Fig. 9.

Figs. 9 and 10 illustrate the position of the sheave 24 relative to the drum during the first wrap of the second layer of cable on the drum. In this position, the direction of the resultant force A is inclined upwardly with respect to line B, and therefore now urges the bracket 25 to swing in a counter-clockwise direction about its supporting axis 26. Swinging of the bracket 25 in a counter-clockwise direction changes the direction of the spiral of cable wraps in the second layer. This change in the direction of the resultant force is due entirely to the change in effective diameter of the cable winding drum due to the added thickness of the first layer of cable wraps. By proper selection of the diameter of the sheave 24, its location relative to the guide sheave 22 and the cable winding drum 18, this change in effective diameter of the cable winding drum is utilized to change the direction of the inclination of the resultant force acting on the sheave 22 from below to above the pivotal axis of the bracket 25.

Figure 11:
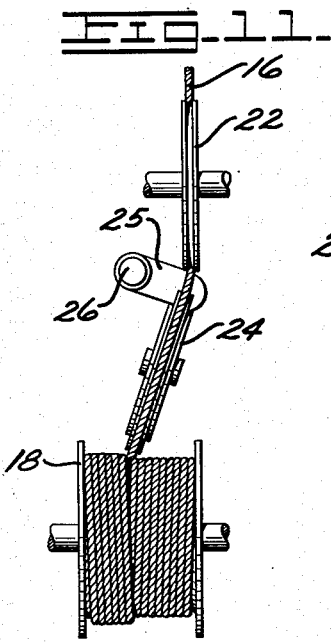
Fig. 11 is a schematic end view of the guide sheaves and cable winding drum illustrating the position of the various parts in their positions at the midpoint of the second layer of cable wraps on the drum.
Figure 12:
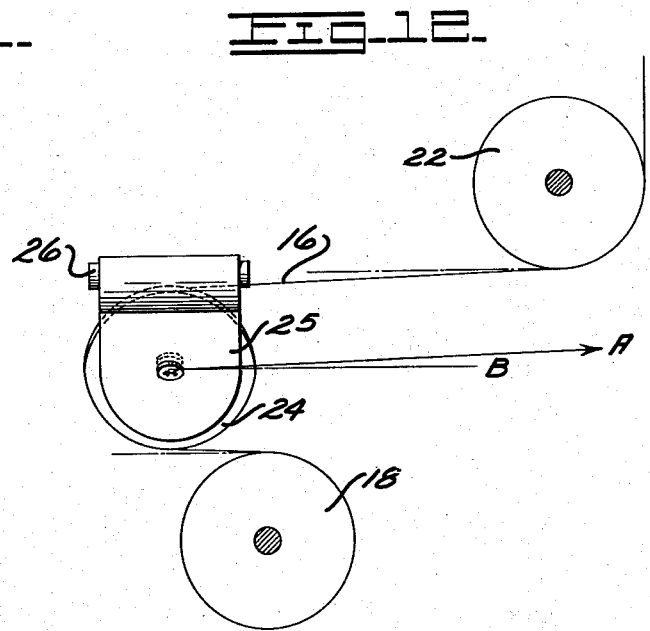
Fig. 12 is a schematic view in side elevation of the parts illustrated in Fig. 11.

Figs. 11 and 12 illustrate the position of the sheave 24 relative to the cable winding drum at approximately the midpoint of the second layer of cable wraps where the resultant force A continues to be inclined upwardly with respect to line B, urging the bracket 25 to swing in a counter-clockwise direction.

Figure 13:
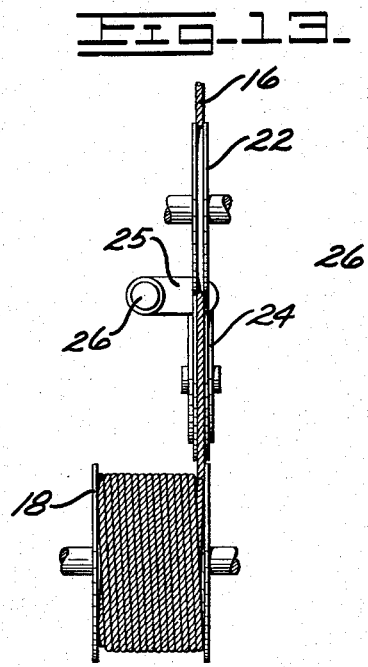
Fig. 13 is a schematic end view of the guide sheaves and cable winding drum illustrating the position of the various parts at the end of the second layer of cable wraps on the drum.
Figure 14:
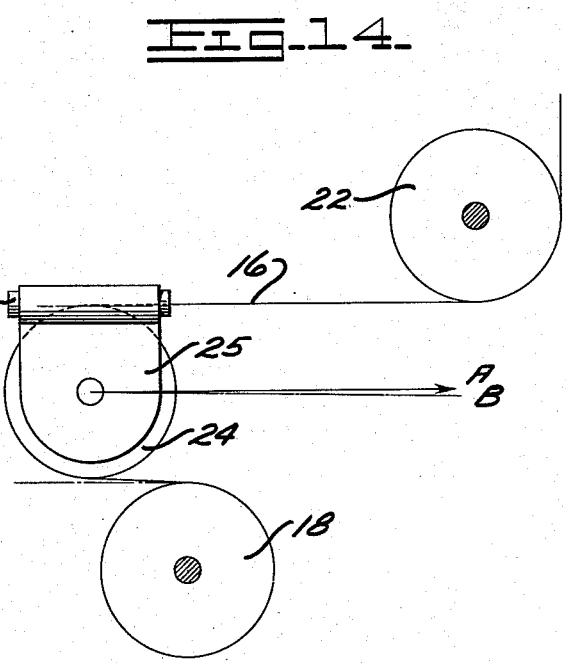
Fig. 14 is a view in side elevation of the parts illustrated in Fig. 13.

Figs. 13 and 14 illustrate the position of the sheave 24 relative to the cable winding drum at the end of the second layer of cable wraps and show the resultant force A still inclined upwardly with respect to line B.

In practice, it has been found desirable to arrange the sheaves and cable winding drum relative to each other so that the lead angle produced by the resultant force of the cable tension approaches but is always slightly less than the helix angle of the cable on the drum thus insuring that the cable wraps will be closely and evenly spaced.

I claim:

A cable laying sheave to guide cable from a guide sheave to a drum, the cable laying sheave being rotatable on an axis generally parallel to but disposed to one side of the axes of the guide sheave and the drum whereby the cable will lead onto and off of the cable laying sheave in the same general direction, a single pivotal support for the cable sheave offset from and transverse to its axis of rotation and offset from its plane of rotation, and means supporting the drum and guide sheave in positions to tension the cable to produce a component of force tending to swing the cable sheave on its pivotal support in anticipation of the advancing spiral of the cable as it is wound upon the drum, said positions being selected to reverse the direction of swing of the cable sheave when the effective diameter of the drum is increased by the completion of a full layer of cable turns thereon.

PAUL B. BENNER.

REFERENCES CITED

The following references are of record in the file of this patent:

UNITED STATES PATENTS

| Number | Name | Date |
|---|---|---|
| 736,472 | Anderson | Aug. 18, 1903 |
| 2,366,433 | Bridwell et al. | Jan. 2, 1945 |
| 2,430,618 | Rockwell | Nov. 11, 1947 |
| 2,473,628 | Allison | June 21, 1949 |
| 2,501,837 | Benner | Mar. 28, 1950 |